United States Patent
Kennedy et al.

(10) Patent No.: US 10,652,935 B1
(45) Date of Patent: *May 12, 2020

(54) SECURE WIRELESS NETWORKS FOR VEHICLES

(71) Applicant: Platform Science, Inc., San Diego, CA (US)

(72) Inventors: John C. Kennedy, San Diego, CA (US); Scott Kopchinsky, San Diego, CA (US); Don Son, San Diego, CA (US); Jacob Fields, San Diego, CA (US); Emily Stuart, San Diego, CA (US); Darrin Demchuk, San Diego, CA (US)

(73) Assignee: Platform Science, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/416,396

(22) Filed: May 20, 2019

Related U.S. Application Data

(63) Continuation-in-part of application No. 16/118,436, filed on Aug. 31, 2018, now Pat. No. 10,334,638,
(Continued)

(51) Int. Cl.
*H04W 76/10* (2018.01)
*H04W 76/19* (2018.01)
(Continued)

(52) U.S. Cl.
CPC ............. *H04W 76/10* (2018.02); *H04L 67/12* (2013.01); *H04W 76/19* (2018.02); *H04W 84/005* (2013.01); *H04W 84/12* (2013.01)

(58) Field of Classification Search
CPC ... H04W 76/10; H04W 76/19; H04W 84/005; H04W 84/12; H04L 67/12
See application file for complete search history.

(56) References Cited

U.S. PATENT DOCUMENTS

| | | |
|---|---|---|
| 5,579,233 A | 11/1996 | Burns |
| 5,995,898 A | 11/1999 | Tuttle |

(Continued)

FOREIGN PATENT DOCUMENTS

WO WO2016/012064 1/2016

OTHER PUBLICATIONS

International Search Report for PCT Application PCT/US2017/037825, dated Sep. 21, 2017.
(Continued)

*Primary Examiner* — Kyaw Z Soe
(74) *Attorney, Agent, or Firm* — Clause Eight IPS; Michael Catania

(57) ABSTRACT

A system and method (600) of securely and accurately connecting mobile devices (110) to wireless networks in vehicles (210) for a predetermined work assignment by using encrypted wireless network configurations based on vehicle specific data is disclosed herein. The system comprises a vehicle (210) comprising an on-board computer (232) with a memory (231) having a vehicle identification number (233), a connector plug (235), and an motorized engine (234), a connected vehicle device (130) comprising a processor, a WiFi radio, a BLUETOOTH radio, a memory, and a connector for mating with the connector plug of the vehicle (210), and a mobile device (110) comprising a graphical user interface (335), a processor (310), a WiFi radio (307), a BLUETOOTH radio (306), and a cellular network interface (308).

20 Claims, 8 Drawing Sheets

Related U.S. Application Data which is a continuation of application No. 15/917,633, filed on Mar. 11, 2018, now Pat. No. 10,070,471, which is a continuation of application No. 15/624,814, filed on Jun. 16, 2017, now Pat. No. 9,961,710.

(60) Provisional application No. 62/352,014, filed on Jun. 19, 2016.

(51) Int. Cl.
*H04W 84/12* (2009.01)
*H04W 84/00* (2009.01)
*H04L 29/08* (2006.01)

(56) References Cited

U.S. PATENT DOCUMENTS

| | | |
|---|---|---|
| 6,292,724 B1 | 9/2001 | Apsell et al. |
| 6,611,686 B1 | 8/2003 | Smith et al. |
| 6,651,001 B2 | 11/2003 | Apsell |
| 6,735,150 B2 | 5/2004 | Rothman |
| 7,092,803 B2 | 8/2006 | Kapolka et al. |
| 7,555,378 B2 | 6/2009 | Larschan et al. |
| 8,626,144 B2 | 1/2014 | Talty et al. |
| 8,855,626 B2 | 10/2014 | O'Toole et al. |
| 9,215,590 B2 | 12/2015 | Bondesen et al. |
| 9,445,447 B2 | 9/2016 | Pal et al. |
| 9,544,768 B2 | 1/2017 | Steffey et al. |
| 9,578,668 B2 | 2/2017 | Sim |
| 9,632,506 B2 | 4/2017 | Wellman et al. |
| 9,961,710 B2 | 5/2018 | Son et al. |
| 10,070,471 B2 | 9/2018 | Son et al. |
| 10,334,638 B2 | 6/2019 | Son et al. |
| 10,475,258 B1 | 11/2019 | Son et al. |
| 2008/0137860 A1 | 6/2008 | Silvernail |
| 2009/0099724 A1 | 4/2009 | Kranz et al. |
| 2009/0276115 A1 | 11/2009 | Chen |
| 2011/0080256 A1 | 4/2011 | Mehalschick, Sr. |
| 2012/0161927 A1 | 6/2012 | Pierfelice et al. |
| 2012/0254960 A1 | 10/2012 | Lortz et al. |
| 2012/0262283 A1 | 10/2012 | Biondo et al. |
| 2013/0017816 A1 | 1/2013 | Talty et al. |
| 2014/0057593 A1* | 2/2014 | Cloutier .............. H04W 76/10 455/405 |
| 2014/0213176 A1 | 7/2014 | Mendelson |
| 2014/0223235 A1 | 8/2014 | Gundlapalli et al. |
| 2014/0232569 A1 | 8/2014 | Skinder et al. |
| 2015/0099500 A1 | 4/2015 | Chalmers |
| 2015/0172433 A1* | 6/2015 | Liukkonen .......... H04M 1/6091 370/329 |
| 2015/0215986 A1 | 7/2015 | Lei et al. |
| 2015/0339334 A1* | 11/2015 | Hanke ................. H04L 67/306 707/736 |
| 2015/0365979 A1 | 12/2015 | Park |
| 2016/0066127 A1 | 3/2016 | Choi et al. |
| 2016/0084657 A1 | 3/2016 | Schilling et al. |
| 2016/0150588 A1 | 5/2016 | Yae |
| 2016/0277923 A1 | 9/2016 | Steffey et al. |
| 2016/0343255 A1 | 11/2016 | Warren |
| 2017/0011561 A1 | 1/2017 | Makke et al. |
| 2017/0104728 A1 | 4/2017 | Girard et al. |
| 2017/0178035 A1 | 6/2017 | Grimm et al. |

OTHER PUBLICATIONS

European Search Report for EP Application 17815967.9 dated Dec. 4, 2019.

Office Action for U.S. Appl. No. 15/624,814, dated Aug. 22, 2017.

* cited by examiner

US 10,652,935 B1

SECURE WIRELESS NETWORKS FOR VEHICLES

CROSS REFERENCES TO RELATED APPLICATIONS

The Present Application is a continuation-in-part application of U.S. patent application Ser. No. 16/118,436, filed on Aug. 31, 2018, which is a continuation application of U.S. patent application Ser. No. 15/917,633, filed on Mar. 11, 2018, now U.S. patent Ser. No. 10/070,471, issued on Sep. 4, 2018, which is a continuation application of U.S. patent application Ser. No. 15/624,814, filed on Jun. 16, 2017, now U.S. Pat. No. 9,961,710, issued on May 1, 2018, which claims priority to U.S. Provisional Patent Application No. 62/352,014, filed on Jun. 19, 2016, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention generally relates to wireless networks for vehicles.

Description of the Related Art

The prior art discusses various techniques for wireless networks for vehicles.

U.S. Pat. No. 9,215,590 for Authentication Using Vehicle Data Pairing discloses the wireless pairing of a portable device with an on-board computer of a vehicle for authenticating a transaction with a third party.

General definitions for terms utilized in the pertinent art are set forth below.

Beacon is a management frame that contains all of the information about a network. In a WLAN, Beacon frames are periodically transmitted to announce the presence of the network.

BLUETOOTH technology is a standard short range radio link that operates in the unlicensed 2.4 gigaHertz band.

Code Division Multiple Access ("CDMA") is a spread spectrum communication system used in second generation and third generation cellular networks, and is described in U.S. Pat. No. 4,901,307.

FTP or File Transfer Protocol is a protocol for moving files over the Internet from one computer to another.

GSM, Global System for Mobile Communications is a second generation digital cellular network.

Hypertext Transfer Protocol ("HTTP") is a set of conventions for controlling the transfer of information via the Internet from a web server computer to a client computer, and also from a client computer to a web server, and Hypertext Transfer Protocol Secure ("HTTPS") is a communications protocol for secure communication via a network from a web server computer to a client computer, and also from a client computer to a web server by at a minimum verifying the authenticity of a web site.

Internet is the worldwide, decentralized totality of server computers and data-transmission paths which can supply information to a connected and browser-equipped client computer, and can receive and forward information entered from the client computer.

Media Access Control (MAC) Address is a unique identifier assigned to the network interface by the manufacturer.

Memory generally includes any type of integrated circuit or storage device configured for storing digital data including without limitation ROM, PROM, EEPROM, DRAM, SDRAM, SRAM, flash memory, and the like.

Organizationally Unique Identifier (OUI) is a 24-bit number that uniquely identifies a vendor, manufacturer, or organization on a worldwide basis. The OUI is used to help distinguish both physical devices and software, such as a network protocol, that belong to one entity from those that belong to another.

Probe Request: A frame that contains the advertisement IE for a device that is seeking to establish a connection with a proximate device.

Probe Response: A frame that contains the advertisement IE for a device. The Probe Response is sent in response to a Probe Request.

Processor generally includes all types of processors including without limitation microprocessors, general purpose processors, gate arrays, array processors, application specific integrated circuits (ASICs) and digital signal processors.

SSID (Service Set Identifier) is a 1 to 32 byte string that uniquely names a wireless local area network.

Transfer Control Protocol/Internet Protocol ("TCP/IP") is a protocol for moving files over the Internet.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

Wireless Application Protocol ("WAP") is an open, global specification that empowers users with mobile wireless communication devices (such as mobile phones) to easily access data and to interact with Websites over the Internet through such mobile wireless communication device. WAP works with most wireless communication networks such as CDPD, CDMA, GSM, PDC, PHS, TDMA, FLEX, reflex, iDEN, TETRA, DECT, DataTAC, Mobitex and GRPS. WAP can be built on most operating systems including PalmOS, WINDOWS, CE, FLEXOS, OS/9, JavaOS and others.

WAP Push is defined as an encoded WAP content message delivered (pushed) to a mobile communication device which includes a link to a WAP address.

Wireless AP (access point) is a node on the wireless local area network (WLAN) that allows wireless devices to connect to a wired network using Wi-Fi, or related standards.

There is a need for securely connecting multiple devices to a single access point in a vehicle, while preventing malicious users from detecting and connecting to a wireless network published on a vehicle.

BRIEF SUMMARY OF THE INVENTION

The present invention provides a system and method of securely and accurately connecting mobile devices to wireless networks in vehicles by using encrypted wireless network configurations based on vehicle specific data.

One aspect of the present invention is a method for a secure connection to a wireless network of a vehicle for a predetermined work assignment. The method includes broadcasting a wireless network having a service set identifier (SSID) from a CVD physically connected to an on-board computer of an assigned vehicle of a plurality of vehicles at a facility. The SSID of the wireless network is not published. The method also includes connecting the CVD with a mobile device for the predetermined work assignment, the CVD using an encrypted password, the CVD of the assigned vehicle broadcasting the wireless network with the unpublished SSID, and the CVD previously paired with the mobile device according to at least one of a driver, a vehicle with a known identification, and a mobile device with a known identification. The vehicle comprises the on-board computer with a memory having a vehicle identification number (VIN), a connector plug, and an motorized engine. The CVD comprises a processor, a WiFi radio, a BLUETOOTH radio, a memory, and a connector for pairing with the connector plug of the vehicle. The mobile device comprises a graphical user interface, a processor, a WiFi radio, a BLUETOOTH radio, and a cellular network interface.

Another aspect of the present invention is a method for a secure connection to a wireless network of a vehicle for a predetermined work assignment. The method includes assigning the predetermined work assignment through a pairing event. The method also includes broadcasting a wireless network having a service set identifier (SSID) from a CVD physically connected to an on-board computer of an assigned vehicle of a plurality of vehicles at a facility. The SSID of the wireless network is not published. The method also includes connecting the CVD with a mobile device for the predetermined work assignment, the CVD using an encrypted password, the CVD of the assigned vehicle broadcasting the wireless network with the unpublished SSID, and the CVD previously paired with the mobile device according to the pairing event. The vehicle comprises the on-board computer with a memory having a vehicle identification number (VIN), a connector plug, and an motorized engine. The CVD comprises a processor, a WiFi radio, a BLUETOOTH radio, a memory, and a connector for pairing with the connector plug of the vehicle. The mobile device comprises a graphical user interface, a processor, a WiFi radio, a BLUETOOTH radio, and a cellular network interface.

Yet another aspect of the present invention is a system for a secure connection to a wireless network of a vehicle for a predetermined work assignment. The system comprises a vehicle, a CVD, and a mobile device. The vehicle comprises an on-board computer with a memory having a vehicle identification number (VIN), a connector plug, and an motorized engine. The CVD comprises a processor, a WiFi radio, a BLUETOOTH radio, a memory, and a connector for pairing with the connector plug of the vehicle. The mobile device comprises a graphical user interface, a processor, a WiFi radio, a BLUETOOTH radio, and a cellular network interface. The predetermined work assignment is assigned through a pairing event. The mobile device has been previously paired with the CVD and has been provided the SSID and an encrypted password. The CVD is configured to broadcast a WiFi network having a service set identifier (SSID), wherein the SSID is not published. The mobile device is configured to search for the vehicle having the CVD broadcasting the WiFi network with the SSID. The mobile device is configured to connect with the CVD using the encrypted password.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
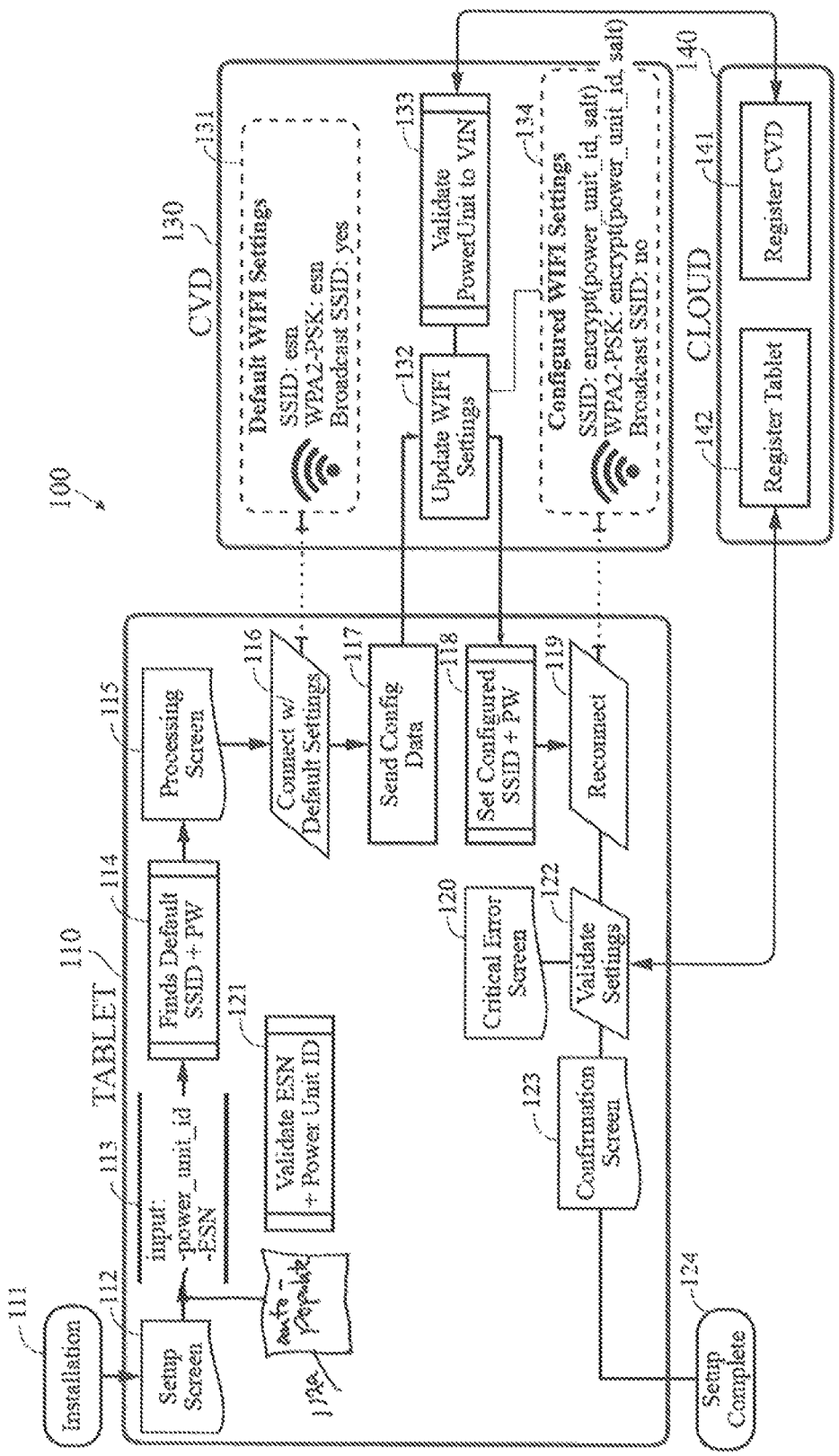
FIG. 1 is a block diagram of system for securely connecting a wireless device to a single access point in a vehicle.
Figure 2:
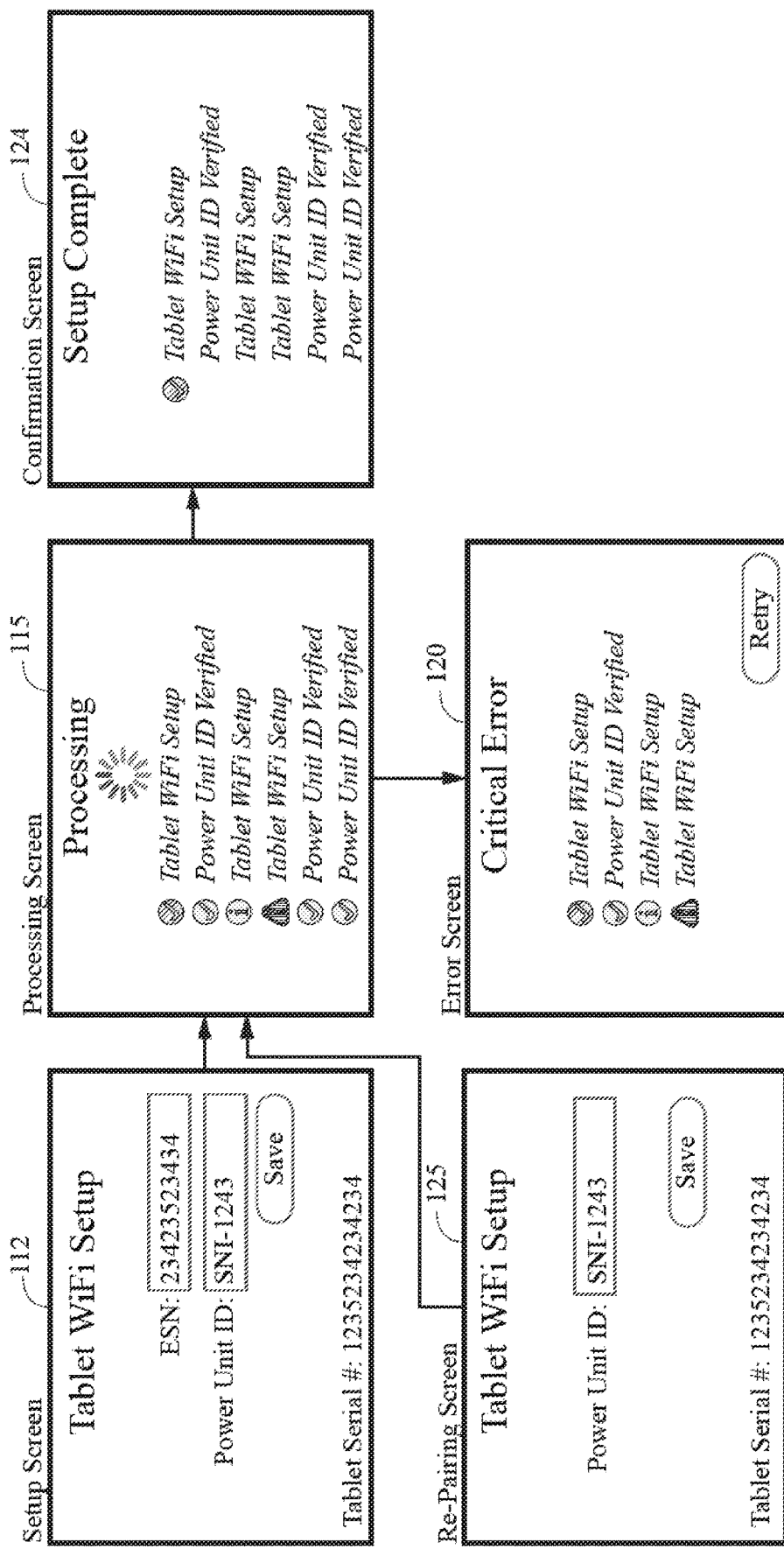
FIG. 2 is a block diagram of system for securely connecting a wireless device to a single access point in a vehicle.

FIGS. 1 and 2 illustrate a pairing process for a system 100 for securely connecting a wireless device to a single access point in a vehicle for a predetermined work assignment. The predetermined work assignment is a temporal event with a fixed start and completion based on assignable boundary conditions. The assignable boundary condition is at least one of a predetermined time period, a geographical destination, and a set route. Alternatively, the assignable boundary condition is any feature with a beginning and a termination. The assigning authority is performed by a person or persons, who have the appropriate authority and mechanisms to assign specific tasks and assets to a specific vehicle and vehicle operator or custodian, and to assign workflow assignments to same. The predetermined work assignment is assigned to a known person or entity that has its own primary networked device accessible through a password protected user interface, a specific name and password that auto-populates or otherwise automatically satisfies a plurality of credentials requirements, wherein the plurality of credential requirements are automatically available or revoked based on the assignable boundary condition identified in a pairing event.

The secure connection is preferably established between a tablet computer 110 and connected vehicle device ("CVD") 130. The CVD 130 is preferably physically connected to an on-board computer of a vehicle. The vehicle is preferably a delivery truck or a long-haul semi-truck. The CVD 130 does not broadcast a SSID, and thus the wireless network is unpublished. The tablet computer 110, having previously paired with the CVD 130, is used to "find" or re-pair with the wireless network of the CVD 130 since WiFi settings are retained in a memory of the tablet computer 130. At block 111, the installation begins for the tablet computer 110. At block 112, a setup screen having an ESN, a power unit identification and a tablet computer serial number is displayed. At block 112a the device of the known person or known entity uses at least one of a password protected user interface, a specific name and password that auto-populates or otherwise automatically satisfies credentials requirements for the pairing event. At block 113, the identifications are inputted, and at block 121 they are validated. At block 114, it finds the default SSID plus the password. At block 115, the processing occurs including the processing of the tablet computer setup and the verification of the power unit identification. At block 116, it connects with the default settings to the CVD 130 pairing with the default settings 131 of the CVD 130. At block 117, the tablet computer sends configuration data to the CVD 130. At block 132, the CVD 130 updates the WiFi settings and at block 133 validates the power unit to the VIN. At block 140, the CVD 130 is registered with a cloud computing service 140, and at block 142, the tablet computer is registered with the cloud computing service 140. At block 118, the tablet computer 110 sets the configured SSID and password from the CVD 130. At block 119, the tablet computer 110 reconnects with the configured WiFi settings. At block 134 on the CVD 130, the configured WiFi settings include the SSID, encrypted, the WPA2 PSK: encrypt (power unit identification salt) and the SSID is not broadcasted. At block 122, the settings are validated on the tablet computer 110. Block 120 is a critical error screen in which the tablet WIFI setup failed or the power unit identification was not verified. At block 123, a confirmation screen is shown on the tablet computer 110. At block 124, the setup is complete. At block 125, a tablet WiFi setup re-pairing screen is shown.

Figure 3:
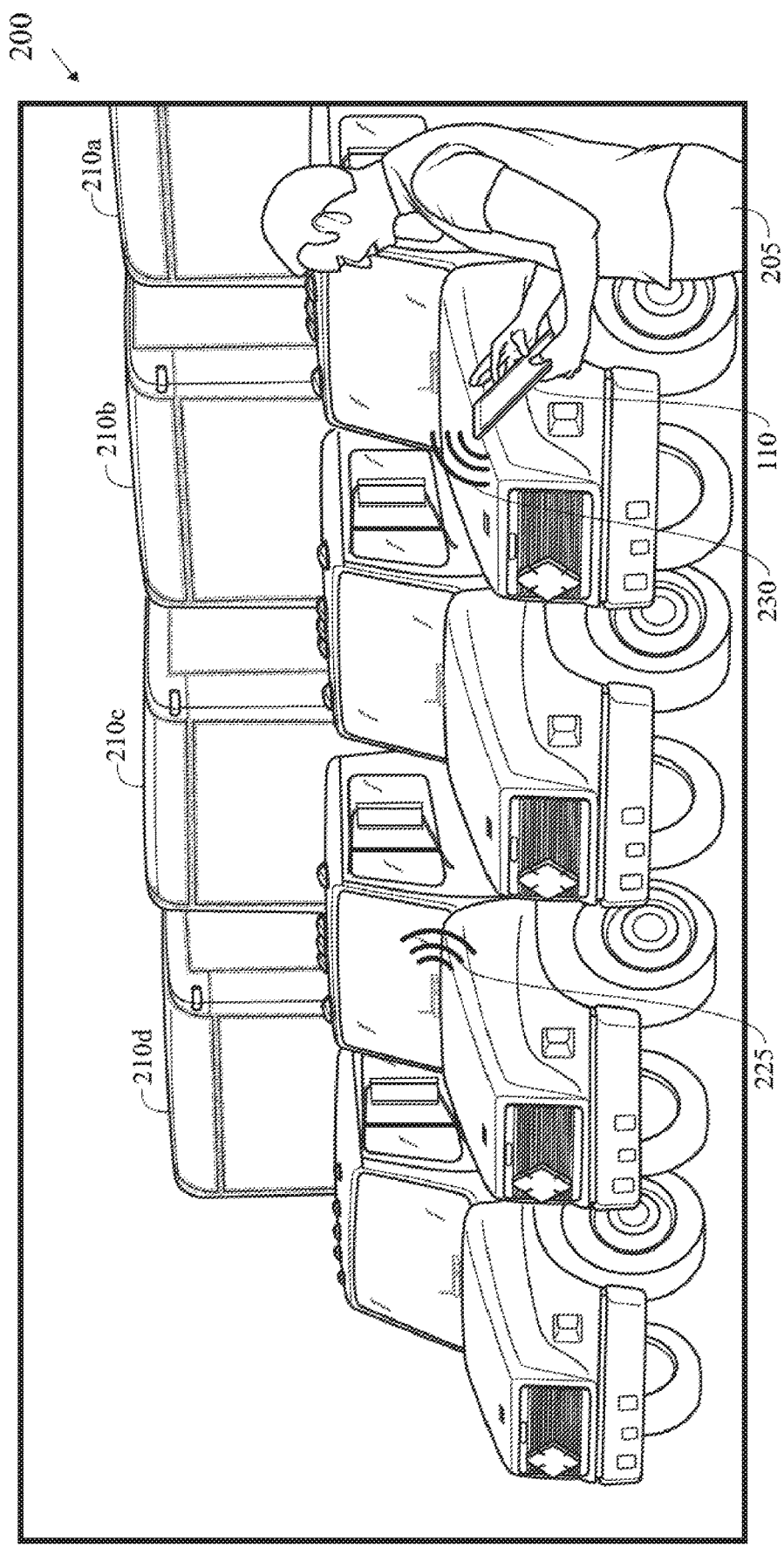
FIG. 3 is an illustration of a driver identifying a vehicle through connection of a tablet computer to an unpublished network.

As shown in FIG. 3, each of a multitude of trucks 210a-210d broadcast a wireless signal for a truck specific network, with one truck 210c broadcasting a wireless signal 225. However, the SSID is not published so unless a driver is already in possession of the SSID, the driver will not be able to pair the tablet computer 110 with the CVD 130 of the truck 210 to which the driver is assigned. So even though the wireless signals are being "broadcast", they will not appear on a driver's tablet computer 110 (or other mobile device) unless the tablet computer 110 has already been paired with the CVD 130 of the vehicle 210. A driver 205 in possession of a tablet computer 110 pairs, using a signal 230, the tablet computer 110 with the wireless network 225 of the CVD of the truck 210c, and thus the driver locates the specific truck 210c he is assigned to in a parking lot full of identical looking trucks 210a-d.

For example, on an IPHONE® device from Apple, Inc., the "UDID," or Unique Device Identifier is a combination of forty numbers and letters, and is set by Apple and stays with the device forever.

For example, on an ANDROID based system, one that uses Google Inc.'s ANDROID operating system, the ID is set by Google and created when an end-user first boots up the device. The ID remains the same unless the user does a "factory reset" of the phone, which deletes the phone's data and settings.

The mobile communication device 110, or mobile device, is preferably selected from mobile phones, smartphones, tablet computers, PDAs and the like. Examples of smartphones and the device vendors include the IPHONE® smartphone from Apple, Inc., the DROID® smartphone from Motorola Mobility Inc., GALAXY S® smartphones from Samsung Electronics Co., Ltd., and many more. Examples of tablet computing devices include the IPAD® tablet computer from Apple Inc., and the XOOM™ tablet computer from Motorola Mobility Inc.

The mobile communication device 110 then a communication network utilized preferably originates from a mobile communication service provider (aka phone carrier) of the customer such as VERIZON, AT&T, SPRINT, T-MOBILE, and the like mobile communication service providers, provide the communication network for communication to the mobile communication device of the end user.

Wireless standards utilized include 802.11a, 802.11b, 802.11g, AX.25, 3G, CDPD, CDMA, GSM, GPRS, radio, microwave, laser, Bluetooth, 802.15, 802.16, and IrDA.

BLUETOOTH™ technology operates in the unlicensed 2.4 GHz band of the radio-frequency spectrum, and in a preferred embodiment the secondary device 30 and/or primary device 25 is capable of receiving and transmitting signals using BLUETOOTH™ technology. LTE Frequency Bands include 698-798 MHz (Band 12, 13, 14, 17); 791-960 MHz (Band 5, 6, 8, 18, 19, 20); 1710-2170 MHz (Band 1, 2, 3, 4, 9, 10, 23, 25, 33, 34, 35, 36, 37, 39); 1427-1660.5 MH (Band 11, 21, 24); 2300-2700 MHz (Band 7, 38, 40, 41); 3400-3800 MHz (Band 22, 42, 43), and in a preferred embodiment the secondary device 30 and/or the primary device 25 is capable of receiving and transmitting signals using one or more of the LTE frequency bands. WiFi preferably operates using 802.11a, 802.11b, 802.11g, 802.11n communication formats as set for the by the IEEE, and in in a preferred embodiment the secondary device 30 and/or the primary device 25 is capable of receiving and transmitting signals using one or more of the 802.11 communication formats. Near-field communications (NFC) may also be utilized.

Figure 4:
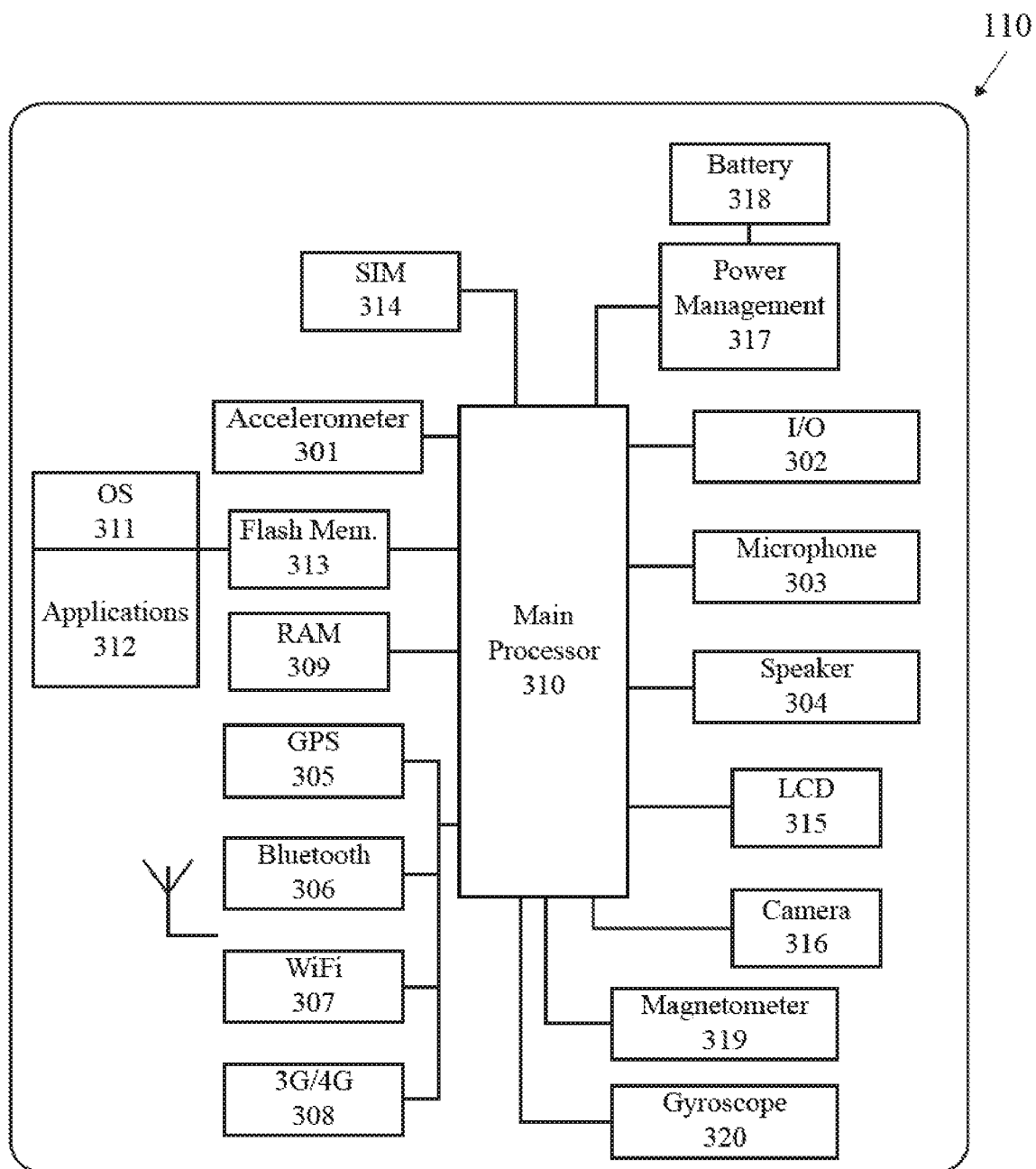
FIG. 4 is an isolated view of general electrical components of a mobile communication device.

As shown in FIG. 4, a typical mobile communication device 110 preferably includes an accelerometer 301, I/O (input/output) 302, a microphone 303, a speaker 304, a GPS chipset 305, a Bluetooth component 306, a Wi-Fi component 307, a 3G/4G component 308, RAM memory 309, a main processor 310, an OS (operating system) 311, applications/software 312, a Flash memory 313, SIM card 314, LCD display 315, a camera 316, a power management circuit 317, a battery 318 or power source, a magnetometer 319, and a gyroscope 320.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. Databases that may be used with the system preferably include but are not limited to MSSQL, Access, MySQL, Progress, Oracle, DB2, Open Source DBs and others. Operating system used with the system preferably include Microsoft 2010, XP, Vista, 200o Server, 2003 Server, 2008 Server, Windows Mobile, Linux, Android, Unix, I series, AS 400 and Apple OS.

The underlying protocol at the cloud server 140, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS") or other similar protocols. The transmission protocol ranges from SIP to MGCP to FTP and beyond. The protocol at the authentication server 40 is most preferably HTTPS.

Wireless standards include 802.11a, 802.11b, 802.11g, AX.25, 3G, CDPD, CDMA, GSM, GPRS, radio, microwave, laser, Bluetooth, 802.15, 802.16, and IrDA.

Figure 5:
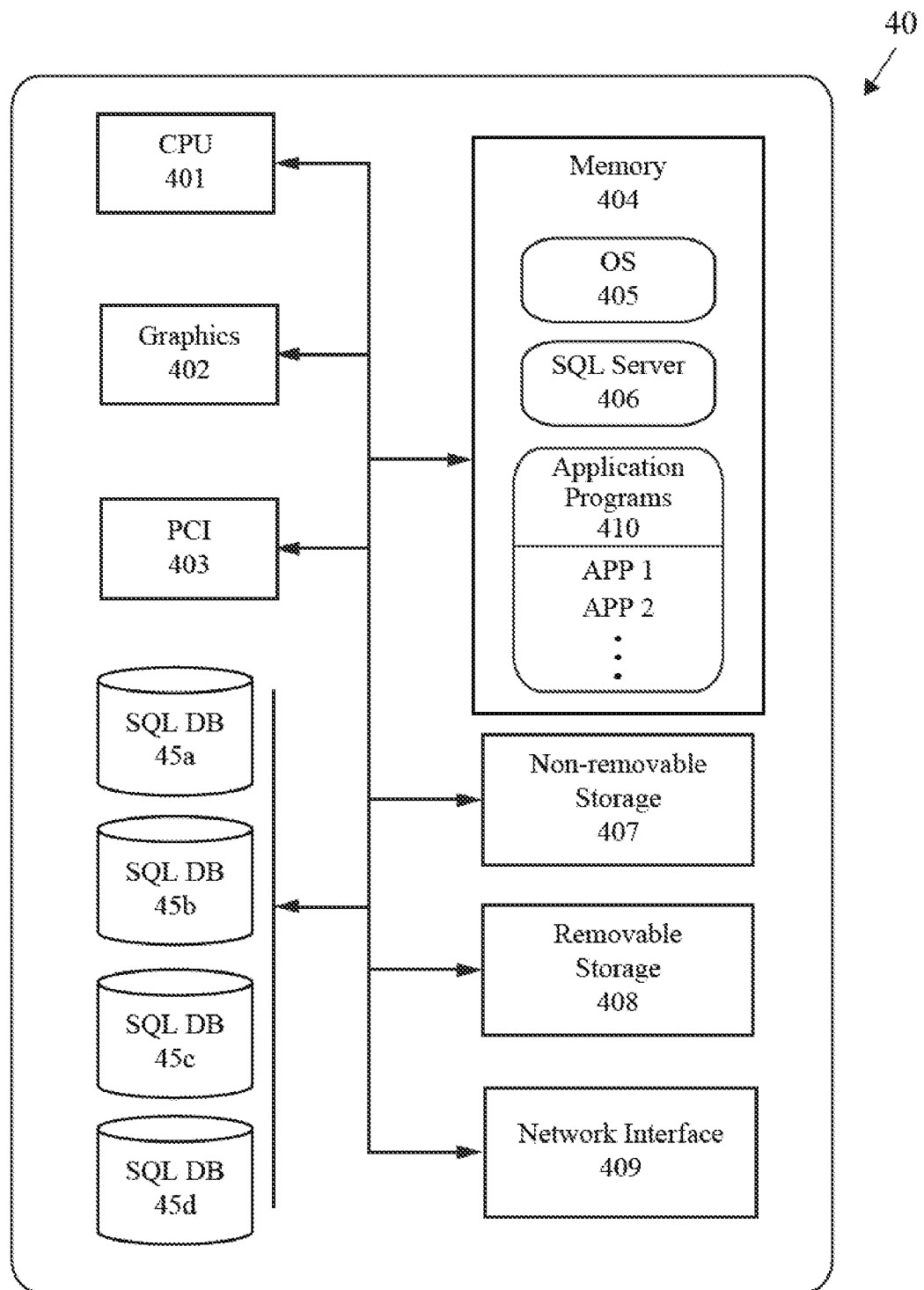
FIG. 5 is an isolated view of general electrical components of a server.

Components of a cloud computing server 140 of the system 100, as shown in FIG. 5, preferably includes a CPU component 401, a graphics component 402, PCI/PCI Express 403, memory 404, non-removable storage 407, removable storage 408, Network Interface 409, including one or more connections to a fixed network, and SQL database(s) 45a-45d, which includes the venue's CRM. Included in the memory 404, is an operating system 405, a SQL server 406 or other database engine, and computer programs/software 410. The venue server 40 also includes at least one computer program configured to receive data uploads and store the data uploads in the SQL database. Alternatively, the SQL server can be installed in a separate server from the venue server 40.

Figure 6:
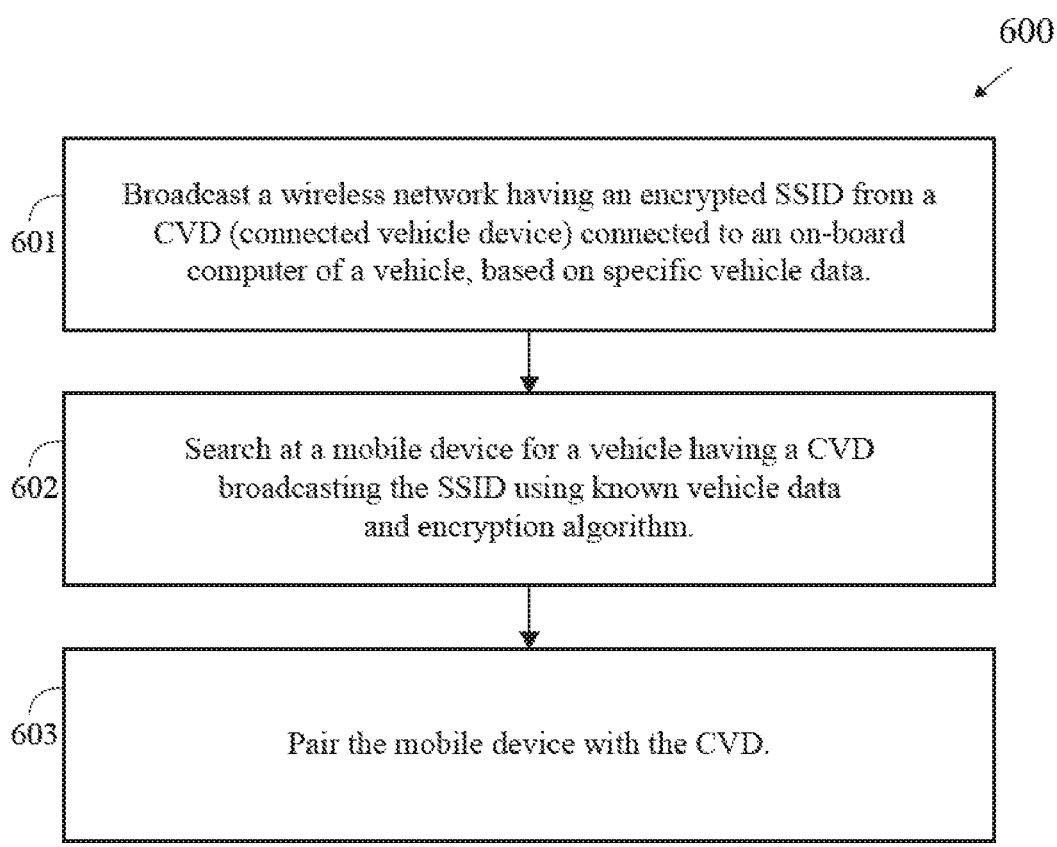
FIG. 6 is a flow chart of method for securely connecting a wireless device to a single access point in a vehicle.

A flow chart for a method 600 for a secure connection to a wireless network of a vehicle is shown in FIG. 6. At block 601, the CVD broadcasts an encrypted, blind SSID based on specific vehicle data. At block 602, leveraging the known vehicle data and the encryption algorithm a mobile device searches for a vehicle having a CVD broadcasting the wireless network. At block 603, the mobile device is paired with the CVD.

Figure 7:
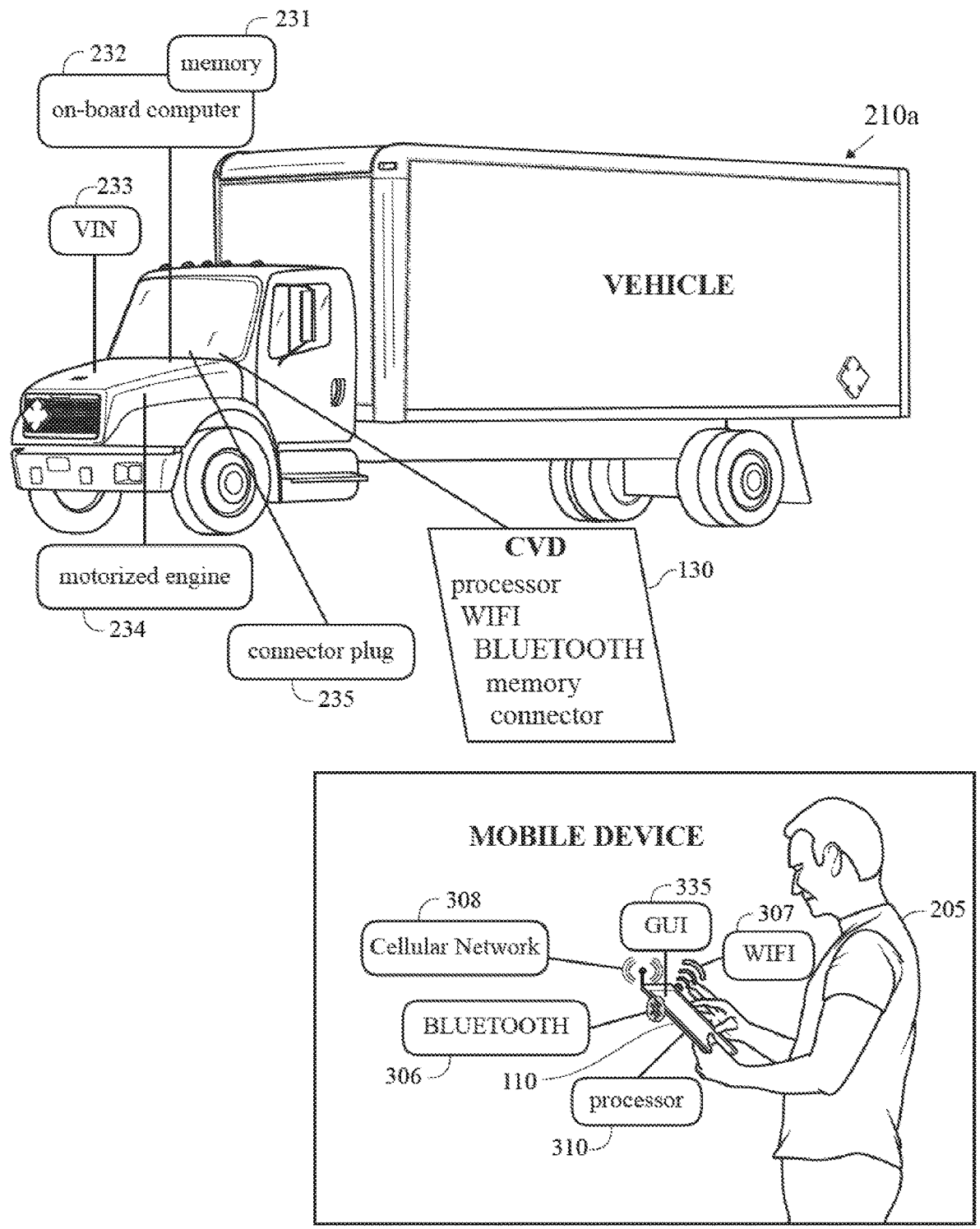
FIG. 7 is an illustration of a system for securely connecting a wireless device to a single access point in a vehicle.

A system for a secure connection to a wireless network of a vehicle is shown in FIG. 7. A truck 210a. Those skilled in the pertinent art will recognize that the truck 210a may be replaced by any type of vehicle (such as a bus, sedan, pick-up, sport utility vehicle, limousine, sports car, delivery truck, van, mini-van, motorcycle, and the like) without departing from the scope of spirit of the present invention. The truck 210a preferably comprises a motorized engine 234, a vehicle identification number ("VIN"), an on-board computer 232 with a memory 231 and a connector plug 235. The on-board computer 232 preferably has a digital copy of the VIN in the memory 231. The on-board computer 232 is preferably in communication with the motorized engine 234. The truck 210a may also have a GPS component for location and navigation purposes, a satellite radio such as SIRIUS satellite radio, a driver graphical interface display, a battery, a source of fuel and other components found in a conventional long distance truck.

Also in the truck 210a is a CVD 130 comprising a processor, a WiFi radio, a BLUETOOTH radio, a memory and a connector to connect to the connector plug of the on-board computer 232.

A driver 205 preferably has a mobile communication device such as a tablet computer 110 in order to pair with a wireless network generated by the CVD 130 of the truck 210a. The tablet computer 110 preferably comprises a graphical user interface 335, a processor 310, a WiFi radio 307, a BLUETOOTH radio 306, and a cellular network interface 308.

Figure 8:
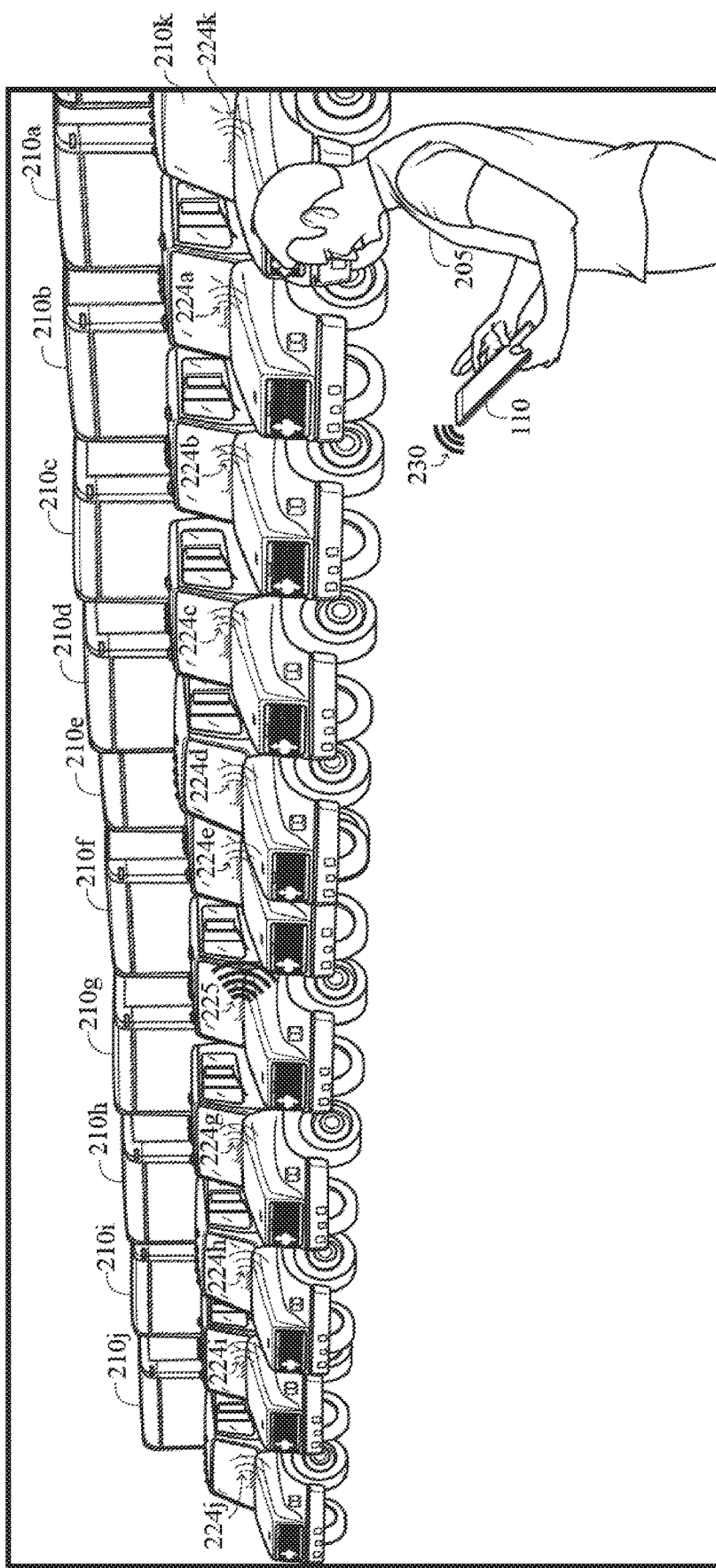
FIG. 8 is an illustration of a driver identifying a vehicle through connection of a tablet computer to an unpublished network.

As shown in FIG. 8, each of a multitude of trucks 210a-210k broadcast a wireless signal 224a-k for a truck specific network, with one truck 210f broadcasting a wireless signal 225. However, all of the wireless signal 224a-224k and 225 do not publish their respective SSID so that a mobile device 110 must already be paired with the CVD 130 of the truck 210 in order to connect to the truck based wireless network 224a-224k or 225 of each of the CVDs 130 of each of the trucks 210a-210k. A driver 205 in possession of a tablet computer 110 pairs with the specific truck wireless network 225 of the CVD 130 of the truck 210f, and thus the driver locates the specific truck 210f he is assigned to in a parking lot full of identical looking trucks 210a-210k.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention the following:

1. A method for a secure connection to a wireless network of a vehicle for a predetermined work assignment, the method comprising:

broadcasting the wireless network having a service set identifier (SSID) from a connected vehicle device (CVD) physically connected to an on-board computer of an assigned vehicle of a plurality of vehicles at a facility, wherein the SSID of the wireless network is not published;

connecting the CVD with a mobile device for the predetermined work assignment, the CVD using an encrypted password, the CVD of the assigned vehicle broadcasting the wireless network with the unpublished SSID, and the CVD previously paired with the mobile device according to at least one of a driver, a vehicle with a known identification, and a mobile device with a known identification;

wherein the vehicle comprises the on-board computer with a memory having a vehicle identification number (VIN), a connector plug, and an motorized engine;

wherein the CVD comprises a processor, a WiFi radio, a BLUETOOTH radio, a memory, and a connector for pairing with the connector plug of the vehicle; and wherein the mobile device comprises a graphical user interface, a processor, a WiFi radio, a BLUETOOTH radio, and a cellular network interface.

2. The method according to claim 1 wherein the predetermined work assignment is a temporal event with a fixed start and completion based on assignable boundary conditions.

3. The method according to claim 2 wherein the assignable boundary condition is at least one of a predetermined time period, a geographical destination, and a set route.

4. The method according to claim 2 wherein the assignable boundary condition is any feature with a beginning and a termination.

5. The method according to claim 1 further comprising assigning authority for a pairing event.

6. The method according to claim 5 wherein assigning authority is performed by a person or persons, who have the appropriate authority and mechanisms to assign specific tasks and assets to a specific vehicle and vehicle operator or custodian, and to assign workflow assignments to same.

7. The method according to claim 2 further comprising assigning to a known person or entity that has its own primary networked device accessible through a password protected user interface, a specific name and password that auto-populates or otherwise automatically satisfies a plurality of credentials requirements, wherein the plurality of credential requirements are automatically available or revoked based on the assignable boundary condition identified in a pairing event.

8. The method according to claim 1 wherein the plurality of vehicles comprises at least one of a long-haul semi-truck, a bus, a sedan, a pick-up, a sports utility vehicle, a limousine, a sports car, a delivery truck, a van, or a mini-van.

9. The method according to claim 1 wherein the WiFi network uses an 802.11 communication protocol.

10. The method according to claim 1 wherein the CVD obtains a vehicle identification number (VIN) from the on-board computer and transmits the VIN to the mobile device over the WiFi network for verification of the vehicle.

11. A method for a secure connection to a wireless network of a vehicle for a predetermined work assignment, the method comprising:
- assigning the predetermined work assignment through a pairing event;
- broadcasting the wireless network having a service set identifier (SSID) from a connected vehicle device (CVD) physically connected to an on-board computer of an assigned vehicle of a plurality of vehicles at a facility, wherein the SSID of the wireless network is not published;
- connecting the CVD with a mobile device for the predetermined work assignment, the CVD using an encrypted password, the CVD of the assigned vehicle broadcasting the wireless network with the unpublished SSID, and the CVD previously paired with the mobile device according to the pairing event;
- wherein the vehicle comprises the on-board computer with a memory having a vehicle identification number (VIN), a connector plug, and an motorized engine;
- wherein the CVD comprises a processor, a WiFi radio, a BLUETOOTH radio, a memory, and a connector for pairing with the connector plug of the vehicle; and
- wherein the mobile device comprises a graphical user interface, a processor, a WiFi radio, a BLUETOOTH radio, and a cellular network interface.

12. The method according to claim 11 wherein the predetermined work assignment is a temporal event with a fixed start and completion based on assignable boundary conditions.

13. The method according to claim 12 wherein the assignable boundary condition is at least one of a predetermined time period, a geographical destination, and a set route.

14. The method according to claim 12 wherein the assignable boundary condition is any feature with a beginning and a termination.

15. The method according to claim 1 further comprising assigning authority for a pairing event.

16. The method according to claim 15 wherein assigning authority is performed by a person or persons, who have the appropriate authority and mechanisms to assign specific tasks and assets to a specific vehicle and vehicle operator or custodian, and to assign workflow assignments to same.

17. The method according to claim 12 wherein the pairing event comprises assigning to a known person or entity that has its own primary networked device accessible through a password protected user interface, a specific name and password that auto-populates or otherwise automatically satisfies a plurality of credentials requirements, wherein the plurality of credential requirements are automatically available or revoked based on the assignable boundary condition identified in the pairing event.

18. The method according to claim 11 wherein the plurality of vehicles comprises at least one of a long-haul semi-truck, a bus, a sedan, a pick-up, a sports utility vehicle, a limousine, a sports car, a delivery truck, a van, or a mini-van.

19. The method according to claim 11 wherein the CVD obtains a vehicle identification number (VIN) from the on-board computer and transmits the VIN to the mobile device over the WiFi network for verification of the vehicle.

20. A system for a secure connection to a wireless network of a vehicle for a predetermined work assignment, the system comprising:
- a vehicle comprising an on-board computer with a memory having a vehicle identification number (VIN), a connector plug, and an motorized engine;
- a connected vehicle device (CVD) comprising a processor, a WiFi radio, a BLUETOOTH radio, a memory, and a connector for pairing with the connector plug of the vehicle; and
- a mobile device comprising a graphical user interface, a processor, a WiFi radio, a BLUETOOTH radio, and a cellular network interface;
- wherein the predetermined work assignment is assigned through a pairing event;
- wherein the mobile device has been previously paired with the CVD and has been provided the SSID and an encrypted password;
- wherein the CVD is configured to broadcast a WiFi network having a service set identifier (SSID), wherein the SSID is not published;
- wherein the mobile device is configured to search for the vehicle having the CVD broadcasting the WiFi network with the SSID;
- wherein the mobile device is configured to connect with the CVD using the encrypted password.

* * * * *